United States Patent
Chen et al.

(10) Patent No.: US 12,164,750 B2
(45) Date of Patent: Dec. 10, 2024

(54) INPUT METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Zhiye Chen, Guangdong (CN); Fanxiu Kong, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/365,056

(22) Filed: Aug. 3, 2023

(65) Prior Publication Data

US 2024/0184421 A1    Jun. 6, 2024

Related U.S. Application Data

(63) Continuation of application No. PCT/CN2022/070492, filed on Jan. 6, 2022.

(30) Foreign Application Priority Data

Feb. 4, 2021  (CN) .......................... 202110158863.1

(51) Int. Cl.
*G06F 3/0482*  (2013.01)
*G06F 3/04812*  (2022.01)

(52) U.S. Cl.
CPC ........ *G06F 3/0482* (2013.01); *G06F 3/04812* (2013.01)

(58) Field of Classification Search
CPC .......................... G06F 3/0482; G06F 3/04812
See application file for complete search history.

(56) References Cited

U.S. PATENT DOCUMENTS

| | | | |
|---|---|---|---|
| 7,151,533 B2 * | 12/2006 | Van Ieperen | G06F 3/04886 345/173 |
| 11,126,334 B2 * | 9/2021 | Fan | G06F 3/04847 |
| 2011/0285656 A1 * | 11/2011 | Yaksick | G06F 3/04883 345/173 |

(Continued)

FOREIGN PATENT DOCUMENTS

| CN | 101937300 | 1/2011 |
|---|---|---|
| CN | 107025053 | 8/2017 |

(Continued)

OTHER PUBLICATIONS

WIPO, International Search Report and Written Opinion for PCT/CN2022/070492, Apr. 6, 2022.

(Continued)

*Primary Examiner* — Anil K Bhargava
(74) *Attorney, Agent, or Firm* — Hodgson Russ LLP

(57) ABSTRACT

An input method, an electronic device, and a non-transitory computer-readable storage medium. In the method, a floating keyboard corresponding to a current application is displayed, where the floating keyboard includes a key operation area and an input text preview area. At least one text inputted through the key operation area is acquired, and the at least one text is displayed as a target text in the input text preview area. In response to a content delivery instruction associated with the target text, the target text is input into the current application.

20 Claims, 7 Drawing Sheets

(56) References Cited

U.S. PATENT DOCUMENTS

| | | | | |
|---|---|---|---|---|
| 2013/0305178 | A1* | 11/2013 | Matsuzawa | G06F 3/0238 |
| | | | | 715/773 |
| 2014/0019873 | A1* | 1/2014 | Gupta | G06F 9/451 |
| | | | | 715/744 |
| 2014/0372952 | A1* | 12/2014 | Otero | G06F 40/18 |
| | | | | 715/835 |
| 2015/0143234 | A1* | 5/2015 | Norris, III | G06F 3/013 |
| | | | | 715/256 |
| 2016/0291822 | A1 | 10/2016 | Ahuja et al. | |
| 2017/0052703 | A1* | 2/2017 | Bi | G06F 3/0237 |
| 2017/0097765 | A1 | 4/2017 | Chao | |
| 2017/0235484 | A1* | 8/2017 | Griffin | G06F 3/041 |
| | | | | 715/773 |
| 2020/0301574 | A1* | 9/2020 | Zheng | G06F 40/53 |
| 2020/0363949 | A1 | 11/2020 | Gnedin | |
| 2021/0055854 | A1* | 2/2021 | Fan | G06F 3/04886 |
| 2021/0165568 | A1* | 6/2021 | Bhardwaj | G06F 3/04886 |
| 2023/0009807 | A1* | 1/2023 | Xu | H04M 1/724097 |

FOREIGN PATENT DOCUMENTS

| | | |
|---|---|---|
| CN | 107637055 | 1/2018 |
| CN | 107748741 | 3/2018 |
| CN | 109976613 | 7/2019 |
| CN | 110515510 | 11/2019 |
| CN | 107479818 | 1/2020 |
| CN | 111090382 | 5/2020 |
| WO | 2016119549 | 8/2016 |

OTHER PUBLICATIONS

CNIPA, First Office Action for CN Application No. 202110158863.1, May 9, 2023.

CNIPA, Notification to Grant Patent Right for Invention for CN Application No. 202110158863.1, Jul. 12, 2023.

Epo, Extended European Search Report for EP Application No. 22748796.4, Jul. 11, 2024.

* cited by examiner

INPUT METHOD, ELECTRONIC DEVICE, AND STORAGE MEDIUM

CROSS-REFERENCING OF RELEVANT APPLICATIONS

This application is a continuation of International Application No. PCT/CN2022/070492, filed Jan. 6, 2022, which claims priority to Chinese Patent Application No. 202110158863.1, filed Feb. 4, 2021, the entire disclosures of which are incorporated herein by reference.

TECHNICAL FIELD

The present disclosure relates to the field of data processing technology, and in particular, to an input method, an electronic device, and a storage medium.

BACKGROUND

A floating keyboard makes it convenient for a user to type at anywhere on a screen. However, when the user types through the floating keyboard, he/she needs to switch the line of sight back and forth between the floating keyboard and an input box of an application, which easily cause visual fatigue of the user or typos, and also reduces the input speed.

SUMMARY

In view of the above, the present disclosure proposes an input method, an electronic device, and a non-transitory computer-readable storage medium.

In a first aspect, an embodiment of the present disclosure provides an input method applied to an electronic device. In the method, a floating keyboard corresponding to a current application is displayed, where the floating keyboard includes a key operation area and an input text preview area. At least one text input through the key operation area is acquired, and the at least one text is displayed as a target text in the input text preview area. In response to a content delivery instruction associated with the target text, the target text is input into the current application.

In a second aspect, an embodiment of the present disclosure provides an electronic device. The electronic device includes one or more processors and a memory. One or more programs are stored in the memory and configured to be executed by the one or more processors, and the one or more programs are configured to: display a floating keyboard corresponding to a current application, where the floating keyboard includes a key operation area and an input text preview area; display at least one text input through the key operation area, as a target text in the input text preview area; and in response to a content delivery instruction associated with the target text, input the target text into the current application.

In a third aspect, an embodiment of the present disclosure provides a non-transitory computer-readable storage medium storing therein program codes. The program codes, when being executed, cause the processor to: display, in response to detecting a text input instruction corresponding to a current application, a floating keyboard corresponding to the current application, where the floating keyboard includes a key operation area and an input text preview area; display the at least one text input through the key operation area, as a target text in the input text preview area; and in response to a content delivery instruction associated with the target text, input the target text into the current application.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to provide a clearer explanation of technical schemes in the embodiments of the present disclosure, a brief introduction will be given to the accompanying drawings required in the description of the embodiments. Apparently, the accompanying drawings in the following description are only some embodiments of the present disclosure. For those skilled in the art, other accompanying drawings may be obtained based on these drawings without any creative effort.

DETAILED DESCRIPTION OF EMBODIMENTS

The technical schemes in the embodiments of the present disclosure will be clearly and comprehensively described below, in conjunction with the drawings in the embodiments of the present disclosure. Apparently, the described embodiments are merely some, not all, of the embodiments of the present disclosure. Based on the embodiments of the present disclosure, all other embodiments, obtained by those of ordinary skill in the art without making creative efforts, fall within the scope of protection of the present disclosure.

Figure 1:
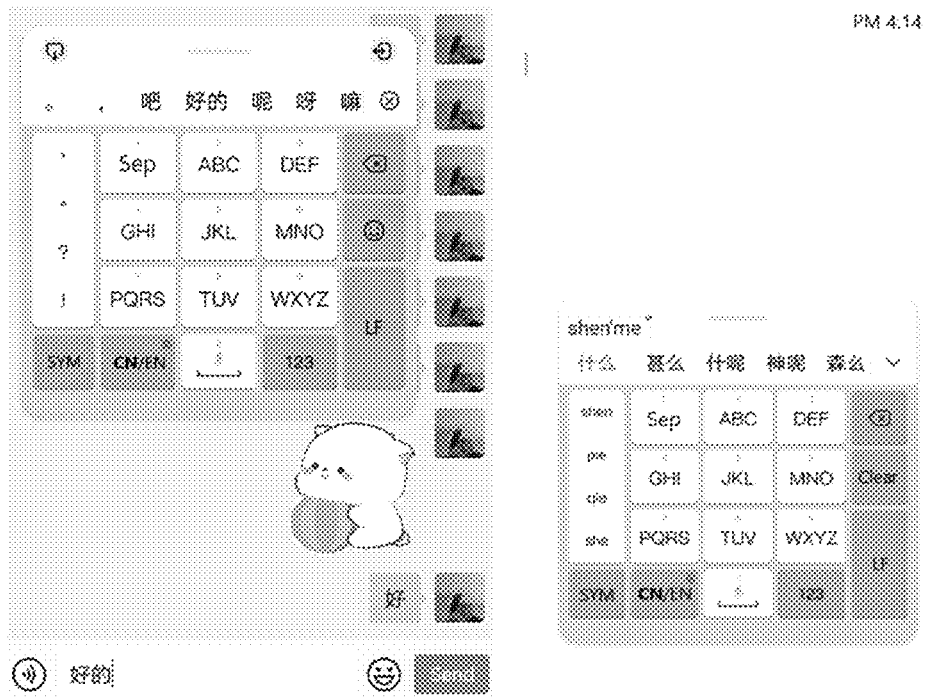
FIG. 1 is a schematic diagram illustrating operation interfaces of a floating keyboard in the related art.

The advent of the floating keyboard greatly facilitates the selection of a typing area on the screen by a user. However, the existing floating keyboard is only a small sized ordinary keyboard, and does not adapt to the input box of an application. This causes the user, when typing on different application interfaces through the floating keyboard, to switch his/her line of sight back and forth between the floating keyboard and the input box of the application (for example, in the case of typing, through the floating keyboard, on the interface of an application as illustrated in the left view of FIG. 1, the input box is located at the bottom of the displayed interface of the application; and in the case of typing, through the floating keyboard, on the interface of an application as illustrated in the right view of FIG. 1, the input box is located at the top of the displayed interface of the application; that is, the user needs to jump his/her line of sight back and forth between the input box of the application and the floating keyboard Jump), resulting in an extremely poor user experience.

An embodiment of the present application provides an input method applied to an electronic device, and the method may include:
  displaying a floating keyboard corresponding to a current application, the floating keyboard including a key operation area and an input text preview area;
  acquiring at least one text input through the key operation area;
  displaying the at least one text as a target text in the input text preview area; and
  inputting the targeted text into the current application, in response to a content delivery instruction associated with the targeted text.

In an implementation, acquiring the at least one text input through the key operation area may include: acquiring, according to a current input mode of the floating keyboard, the at least one text input through the key operation area.

In an implementation, acquiring, according to the current input mode of the floating keyboard, the at least one text input through the key operation area may include: in response to the current input mode being a full keyboard English input mode, acquiring the at least one text input through the key operation area.

In an implementation, acquiring, according to the current input mode of the floating keyboard, the at least one text input through the key operation area may include: in response to the current input mode being a full keyboard Chinese input mode, acquiring candidate texts for an input made through the key operation area, and selecting the at least one text from the candidate texts.

In an implementation, the method may further include: in response to detecting that the current application is switched from a first application to a second application, clearing out a first target text displayed in the input text preview area, where the first target text corresponds to the first application.

In an implementation, after clearing out the first target text displayed in the input text preview area in response to detecting that the current application is switched from the first application to the second application, the method may further include: in response to detecting that the current application is switched from the second application to the first application, restoring displaying, in the input text preview area, of the first target text that was cleared out.

In an implementation, the method may further include: in response to detecting that the current application is switched from the first application to the second application, displaying the target text in a candidate word preview area of the floating keyboard.

In an implementation, the method further includes: in response to detecting an operation performed on the key operation area, replacing the target text with a target text corresponding to the operation.

In an implementation, the floating keyboard further includes an icon display area, and the method may further include: displaying, in the icon display area, an application icon corresponding to the current application.

In an implementation, displaying, in the icon display area, the application icon corresponding to the current application may include: in response to detecting that the current application is switched from the first application to the second application, switching a first application icon displayed in the icon display area to a second application icon, where the first application icon corresponds to the first application, and the second application icon corresponds to the second application.

In an implementation, displaying the floating keyboard corresponding to the current application may include: in response to detecting that an input box corresponding to the current application is in an active state, displaying the floating keyboard corresponding to the current application.

In an implementation, the method may further include: in response to a cursor being displayed in the input box corresponding to the current application, determining that the input box corresponding to the current application is in the active state.

In an implementation, before displaying the floating keyboard corresponding to the current application, the method may further include: in response to detecting that there are multiple applications each in an enabled state at a current moment, determining, as the current application, an application running in foreground from the multiple applications each in the enabled state.

In an implementation, the floating keyboard further includes a send button, and before inputting the target text into the current application in response to the content delivery instruction associated with the target text, the method may also include: in response to triggering of the send button, generating the content delivery instruction associated with the target text; or in response to a word number of the target text acquired reaching a word number threshold, generating the content delivery instruction associated with the target text.

In an implementation, inputting the target text into the current application may include: directly inputting, through the floating keyboard, the target text into the current application.

In an implementation, inputting the target text into the current application may include: directly sending, through the floating keyboard, the target text to a message-receiving object in the current application.

In an implementation, inputting the target text into the current application may include: first sending, through the floating keyboard, the target text to the current application, and then sending, through the current application, the target text to the message-receiving object in the current application.

The embodiments of the present disclosure will be described in detail below with reference to the accompanying drawings.

Figure 2:
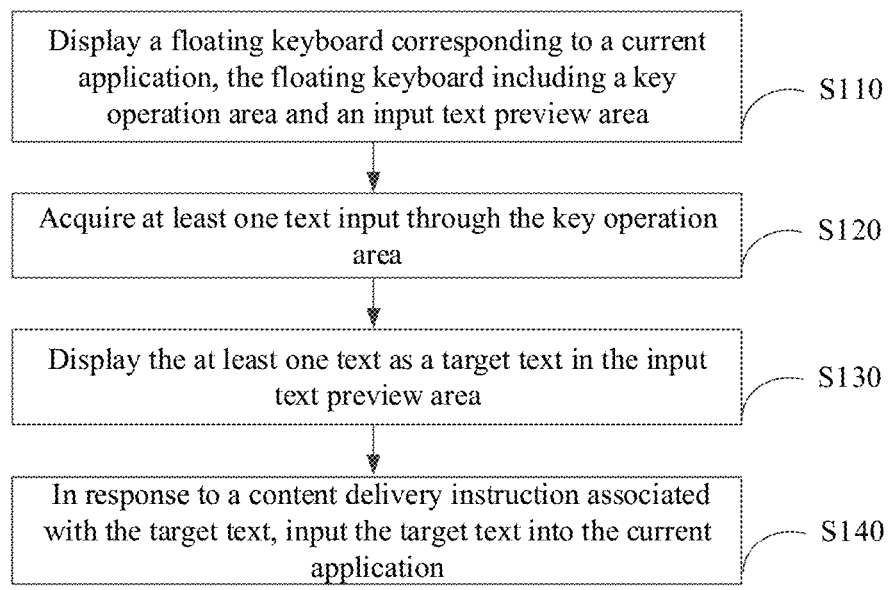
FIG. 2 illustrates a flow chart of an input method provided by an embodiment of the present disclosure.

Referring to FIG. 2, an input method according to an embodiment of the present disclosure is illustrated. The method may be applied to an electronic device, and the method includes operations as follows.

At block S110, a floating keyboard corresponding to a current application is displayed, the floating keyboard including a key operation area and an input text preview area.

In the embodiment, when it is detected that the input box corresponding to the current application is in an active state, the floating keyboard corresponding to the current application may be displayed. In particular, when the user touches the input box corresponding to the current application, and a cursor is displayed in the input box, it is determined that the input box corresponding to the current application is in the active state. In the embodiment, the current application is a newly started application. For example, when using application 1, the user suddenly receives a pop-up message from application 2; when the user switches to application 2 to process the pop-up message, the application 2 is enabled (started), and application 2 may be used as the current application at that time. In some implementations, the current application may also be an application being used at the current moment. It is notable that, when there are multiple applications each in the enabled state at the current moment, an application running in the foreground among the applications each in the enabled state may be determined as the current application, and applications running in the background among the multiple applications each in the enabled state are determined as other applications. The number of the current applications is one.

The floating keyboard in the embodiment may be adapted to a current application of any function. For example, if the current application is an instant messaging application, a floating keyboard corresponding to the instant messaging application may be displayed; if the current application is a battle game application, a floating keyboard corresponding to the battle game application may be displayed. The floating keyboard corresponding to the instant messaging application and the floating keyboard corresponding to the battle game application each include a button operation area and an input text preview area. The display style of the floating keyboard corresponding to the instant messaging application may be different from the display style of the floating keyboard corresponding to the battle game application.

In some implementations, a shortcut button for the "floating keyboard" may be provided in a quick notification bar of the electronic device. When the user touches the shortcut button, the floating keyboard function may be directly triggered and started. If the user triggers and starts the floating keyboard function when using a certain application, at this time, a correspondence is created between the application and the floating keyboard, and the floating keyboard may be displayed on the interface of the application, and the application is the current application.

The floating keyboard in the embodiment includes a key operation area and an input text preview area. The input text preview area has an input function, and the input function of the input text preview area is consistent with an input function of the input box corresponding to the current application. For example, when the current application is the instant messaging application, the input text preview area has a same text input function as the input box of the instant messaging application; and when the current application is notepad application, the input text preview area has a same text input function as the input box of the notepad application.

Figure 3:
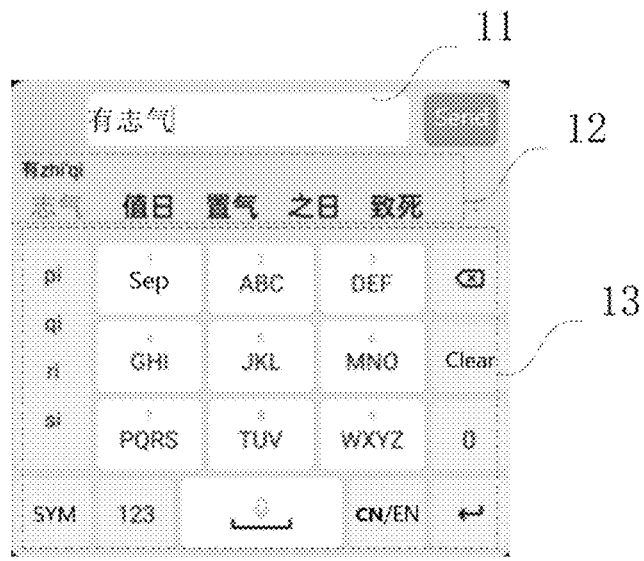
FIG. 3 is a schematic diagram illustrating an interface of the floating keyboard provided by an embodiment of the present disclosure.

Referring to FIG. 3, a schematic diagram of a floating keyboard according to an embodiment of the present disclosure is illustrated. As illustrated in FIG. 3, the floating keyboard includes an input text preview area 11, a candidate word preview area 12, and a key operation area 13. The key operation area 13 is used to type or handwrite a text. The candidate word preview area 12 is used to display candidate texts corresponding to a current typing operation, and input a text selected by the user from the candidate texts to the input text preview area 11. The input text preview area 11 is used to display the text selected from the candidate texts as the target text, or to display at least one text input through the key operation area 13 as the target text.

At block S120, at least one text input through the key operation area is acquired.

As an input mode in the embodiment, when the floating keyboard corresponding to the current application is displayed, the mode of acquiring the input text may be determined according to a current input mode of the floating keyboard. For example, when the input mode of the floating keyboard is a full keyboard English input mode, at least one text input through the key operation area may be directly acquired. And when the input mode of the floating keyboard is a full keyboard Chinese input mode, candidate texts for an input made through the key operation area are acquired, and at least one text is selected from the candidate texts, where the number of the candidate texts may not be limited. The candidate texts illustrated in FIG. 3 may include 气, 值日, 置气, 之日, 致死 (which are Chinese words corresponding to or in proximity to Chinese phonetic alphabets "zhi'qi")" and so on. Among them, each text is a character or word, and the type of content of each text may not be limited. In the embodiment, the type of content of each text may include, but is not limited to: words, including English words; numbers; characters; emoticons, etc.

At block S130, the at least one text is displayed as a target text in the input text preview area.

The floating keyboard in the embodiment may directly display the acquired at least one text as the target text in the input text preview area, and there is no need for the user to jump back and forth between the input box of the current application and the floating keyboard when inputting a text.

At block S140, in response to a content delivery instruction associated with the target text, the target text is input into the current application.

In the embodiment, the floating keyboard may further include a "send" button, and the user may directly click the "send" button on the floating keyboard to input the target text into the current application. Specifically, when the "send" button in the floating keyboard is triggered, the content delivery instruction associated with the target text may be triggered to be generated; as such, the target text may be input into the current application in response to the content delivery instruction. In some implementations, a word number threshold may be set for the target text edited each time, and when a word number of the target text currently acquired reaches the word number threshold, the content delivery instruction associated with the target text is triggered to be generated.

In the present disclosure, there may be multiple ways of inputting the target text into the current application.

As a way, if the current application only stores the input target text, the floating keyboard may directly input the target text into the current application for storage. At this time, the floating keyboard is associated with the current application, that is, the target text input through the floating keyboard at the current moment may be directly input into the current application. For example, if the current application is notepad, the target text displayed in the input text preview area of the floating keyboard may be directly input into Notepad for storage.

As another way, if the current application is the instant messaging application, association between the floating keyboard and the current application may be established when the current application is started, so that the floating keyboard has a same text control function as the input box of the current application (including a function of controlling the display of the target text and a function of controlling the sending of the target text). In this way, at least one text, that needs to be sent to a message-receiving object of the current application, may be directly displayed as the target text in the input text preview area of the floating keyboard, and then the target text is directly sent to the message-receiving object of the current application. This does not need to switch back and forth the user's line of sight between the floating keyboard and the input box of the current application, thereby improving the efficiency of inputting a text.

As a further way, the input text preview area (which may be understood as an application with a text input function and a text display area) of the floating keyboard may first send the target text to the current application, and then the current application sends the target text to other objects (a message-receiving object) in the current application. For example, if the current application is a chat application, the other objects may be objects to chat with.

In the related art, when inputting text content through the floating keyboard, the text content input by the user is synchronized to the input box of the current application in real-time, and the input content is sent on the input box interface of the current application. In this case, there is an inevitable need for the user to switch his/her line of sight between the input box of the current application and the floating keyboard, which is prone to typos, and also reduces the typing efficiency.

In order to alleviate the above problems, the floating keyboard in the embodiment is equipped with an input text preview area and a "send" button; in this case, when the target text is displayed in the input text preview area and a touch operation is performed on the send button, the target text can be directly sent, as a whole, to the current application in response to one touch operation performed on the interface of the floating keyboard, and there is no need for the user to switch his/her line of sight between the input box of the current application and the floating keyboard. Accordingly, this reduces the visual fatigue of the user when typing, and improves the accuracy of typing. Moreover, this can save the time required for the user to switch the line of sight between the input box of the current application and the floating keyboard, and improves the typing efficiency.

In the input method provided in the embodiments of the present disclosure, a floating keyboard corresponding to a current application is displayed, where the floating keyboard includes a key operation area and an input text preview area; at least one text input through the key operation area is acquired, and the at least one text is displayed as a target text in the input text preview area. In response to a content delivery instruction associated with the target text, the target text is input into the current application. With this method, the input content can be viewed directly in the input text preview area of the floating keyboard, without jumping the line of sight to the input box of the current application to view the input content. Therefore, the visual fatigue caused by switching the line of sight back and forth in the text input process is reduced, and the input speed is improved.

Figure 4:
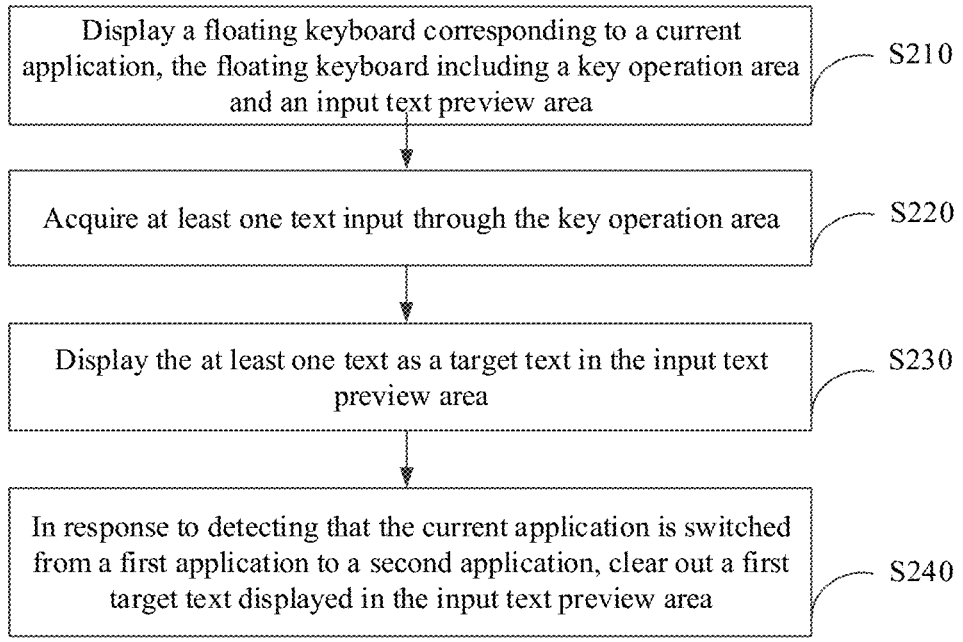
FIG. 4 illustrates a flow chart of an input method provided by another embodiment of the present disclosure.

Referring to FIG. 4, an input method according to another embodiment of the present disclosure is illustrated. The method may be applied to an electronic device, and the method includes operations as follows.

At block S210, a floating keyboard corresponding to a current application is displayed, the floating keyboard including a key operation area and an input text preview area.

At block S220, at least one text input through the key operation area is acquired.

At block S230, the at least one text is displayed as a target text in the input text preview area.

At block S240, in response to detecting that the current application is switched from a first application to a second application, a first to-be-sent text displayed in the input text preview area is cleared out.

As a way to improve the user's input experience, in the embodiment, in response to detecting that the current application is switched from the first application to the second application, the first to-be-sent text displayed in the input text preview area is cleared out, where the first to-be-sent text corresponds to the first application. As such, the user can directly input reply content corresponding to the second application on the floating keyboard. There is no need for the user to first manually clear out the input first to-be-sent text for the input, on the floating keyboard, the reply content corresponding to the second application. Therefore, the time required for the user to manually clear out the input first to-be-sent text is saved, and the typing experience of the user is improved.

Figure 5:
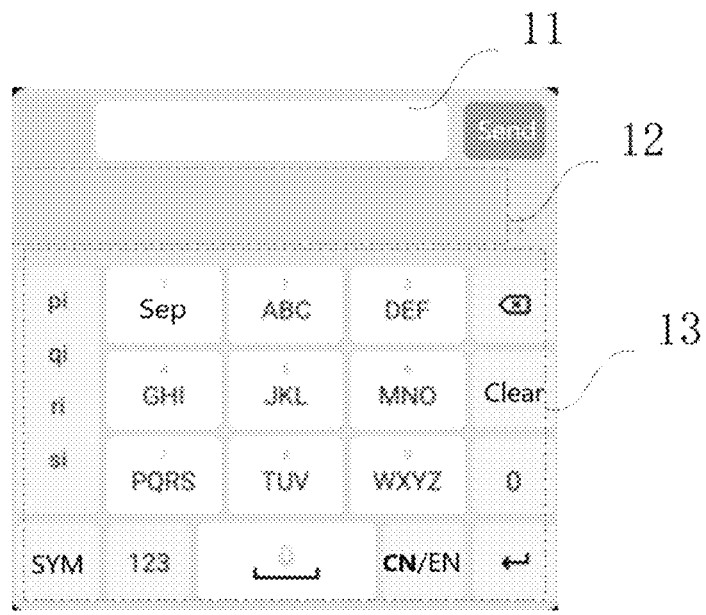
FIG. 5 is a schematic diagram illustrating an interface of the floating keyboard provided by the embodiment of the present disclosure when a current application is switched from a first application to a second application.

In a specific application scenario, assuming that the current application is the first application, as illustrated in FIG. 3, the first to-be-sent text displayed in the input text preview area of the floating keyboard is "有志气" in Chinese (which means "ambitious" in English), and if the current application is switched from the first application to the second application, the first text to-be-sent "有志气" may be cleared out, to obtain a floating keyboard as illustrated in FIG. 5. When clearing out the first to-be-sent text "有志气", the candidate texts displayed in the candidate word preview area may be cleared out simultaneously. That is, after clearing out the candidate texts "志" 气, 值日, 置气, 之日, 致死 displayed in the candidate word preview area, the floating keyboard as illustrated in FIG. 5 may be obtained.

In some other implementations, when clearing out the first to-be-sent text "有志气", the candidate texts displayed in the candidate word preview area may also be retained, and the candidate texts in this way may be blessings related to festivals, birthdays, etc., which is convenient for the user to directly select a text from the candidate texts for input, without typing the same text repeatedly. Under this way, the type of content of the candidate text may be identified by the electronic device. If a candidate text is in a type of blessing, inspiration, or encouragement, the candidate text displayed in the candidate word preview area may be retained at the time of clearing out the first to-be-sent text.

Figure 6:
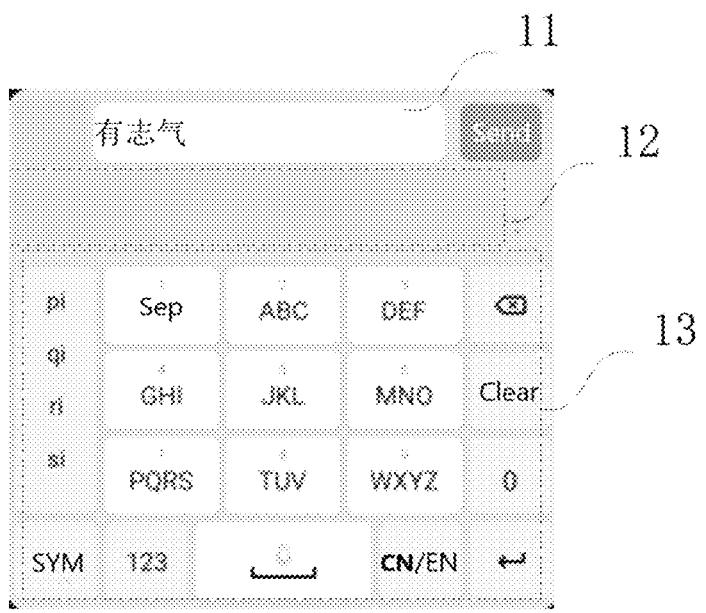
FIG. 6 is a schematic diagram illustrating an interface of the floating keyboard provided by the embodiment of the present disclosure when the current application is switched from the second application to the first application.

As a way, after the first to-be-sent text displayed in the input text preview area is cleared out in response to detecting that the current application is switched from the first application to the second application, when it is detected that the current application is switched from the second application to the first application, and it is detected that there is no input text in the input text preview area, the first to-be-sent text that was cleared out may be restored to be displayed in the input text preview area. For example, in a specific application scenario, in response to the current application being switched from the second application to the first application, if the user has not input a text yet, through the floating keyboard, on the interface of the first application, or if the user did not input a text, through the floating keyboard, on the interface of the second application, the floating keyboard illustrated in FIG. 5 may be jumped to the floating keyboard illustrated in FIG. 6, that is, the first to-be-sent text that was cleared out, such as "有志气" illustrated in FIG. 3, may be restored to be displayed. It is notable that, at this time, the user has not made any input through the floating keyboard, and the cursor illustrated in FIG. 3 may not be restored to be displayed in the input text preview area; and if the user inputs a text, through the floating keyboard, on the interface of the first application, the cursor is displayed.

As another way, after the first to-be-sent text displayed in the input text preview area is cleared out in response to detecting that the current application is switched from the first application to the second application, when it is recognized that a second to-be-sent text displayed in the input text preview area is not null, and it is detected that the current application is switched from the second application to the first application, the second to-be-sent text displayed in the input text preview area may be cleared out, and the first to-be-sent text that was cleared out may be restored to be displayed in the input text preview area, where the second to-be-sent text corresponds to the second application. In a specific application scenario, taking the above example as an example, if the user input a second to-be-sent text "What's for dinner tonight" on the interface of the second application through the floating keyboard, and when the current application jumps back from the second application to the first application, the second to-be-sent text "What's for dinner tonight" displayed in the input text preview area may be cleared out first, and then the first to-be-sent text "有志气" that was cleared out may be restored to be displayed in the input text preview area.

In the input method provided in the embodiments of the present disclosure, by a floating keyboard corresponding to a current application is displayed, where the floating keyboard includes a key operation area and an input text preview area; and at least one text input through the key operation area is obtained, and the at least one text is displayed as a target text in the input text preview area. Then, when it is detected that the current application is switched from the first application to the second application, a first target text displayed in the input text preview area is cleared out. As such, the input content can be directly viewed in the input text preview area of the floating keyboard, without jumping the line of sight to the input box of the current application to view the input content. Therefore, the visual fatigue caused by switching the line of sight back and forth in the text input process is reduced, and the input speed is improved. By clearing out the first to-be-sent text displayed in the input text preview area when it is detected that the current application is switched from the first application to the second application, the time required for the user to manually clear out the input first to-be-sent text is saved, and the user's typing experience is improved.

Figure 7:
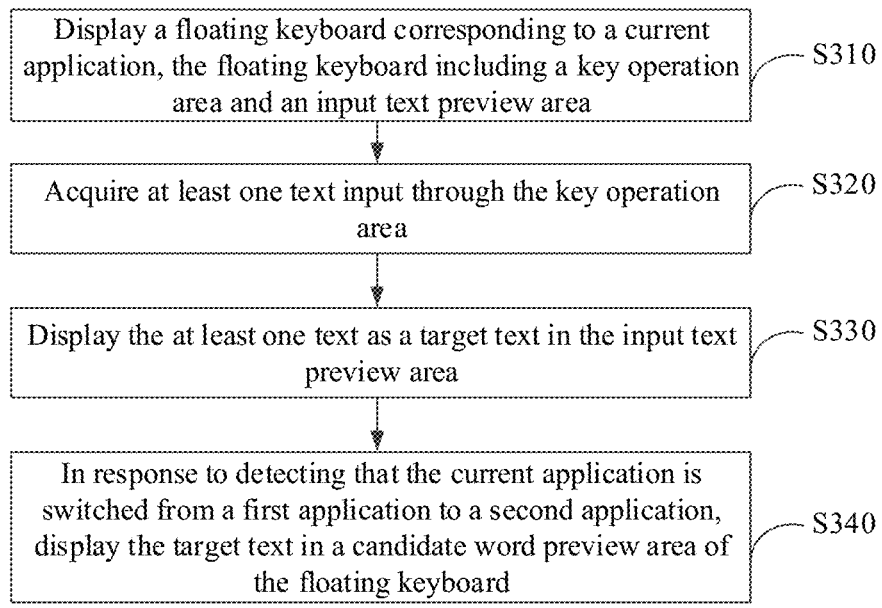
FIG. 7 illustrates a flow chart of an input method provided by a further embodiment of the present disclosure.

Referring to FIG. 7, an input method is provided according to a further embodiment of the present disclosure. The method may be applied to an electronic device, and the method includes operations as follows.

At block S310, a floating keyboard corresponding to a current application is displayed, the floating keyboard including a key operation area and an input text preview area.

At block S320, at least one text input through the key operation area is acquired.

At block S330, the at least one text is displayed as a target text in the input text preview area.

At block S340, in response to detecting that the current application is switched from a first application to a second application, the target text is displayed in a candidate word preview area of the floating keyboard.

As a way, in order to avoid the resource consumption caused by repeatedly inputting the same target text, the target text may be displayed in the candidate word preview area of the floating keyboard when it is detected that the current application is switched from the first application to the second application, so that the user can quickly input the target text.

Figure 8:
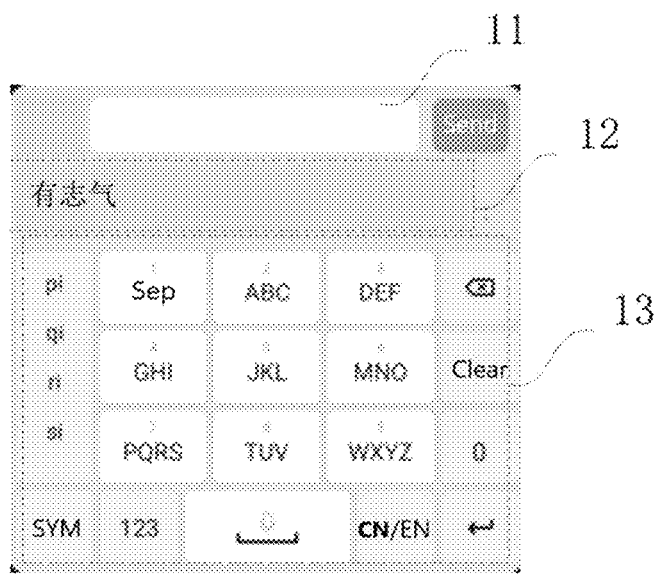
FIG. 8 is another schematic diagram illustrating the interface of the floating keyboard provided by the embodiment of the present disclosure when the current application is switched from the first application to the second application.

For example, in a specific application scenario, as illustrated in FIG. 8, when the current application is the first application, the corresponding to-be-sent text is "有志气"; and when the current application is switched from the first application to the second application, the to-be-sent text "有志气" may be displayed in the candidate word preview area 12 of the floating keyboard.

When there are multiple applications running simultaneously in the electronic device, and the second application is the current application, the first application may be other application(s) in the multiple applications except the second application (that is, the first application may include more than one applications). As an implementation, the number of times that each of the multiple first applications sends each of its respective target texts may be acquired, where the number and content of the to-be-sent texts corresponding to each of the multiple applications may not be limited. And the target texts having a high sending frequency (such as the top three target texts) are sequentially displayed as a list in the candidate word preview. For example, a target text with the highest sending frequency among the top three target texts is arranged at the top, a target text with the lowest sending frequency among the top three target texts is provided at the bottom, and a target text with the medium sending frequency among the top three target texts are provided at the middle. The target text is provided in the middle. Alternatively, only the target text with the highest sending frequency is displayed in the candidate word preview area.

As another implementation, individual target texts may be displayed, in an order of input times of the individual target texts, in the candidate word preview area of the floating keyboard corresponding to the current application. For example, in a case where the first application includes "application A, application B, and application C", the target text corresponding to application A is "Hello, happy New Year", the target text corresponding to application B is "Happy birthday", and the target text corresponding to application C is "This game is really interesting", if the order of the input times of the above three target texts is that: "Happy birthday" is later than "This game is really interesting" which is in turn later than "Hello, happy New Year", the texts "Happy birthday", "This game is really interesting" and "Hello, happy New Year" may be displayed in this order in the candidate word preview area of the floating keyboard from top to bottom or from left to right.

Figure 9:
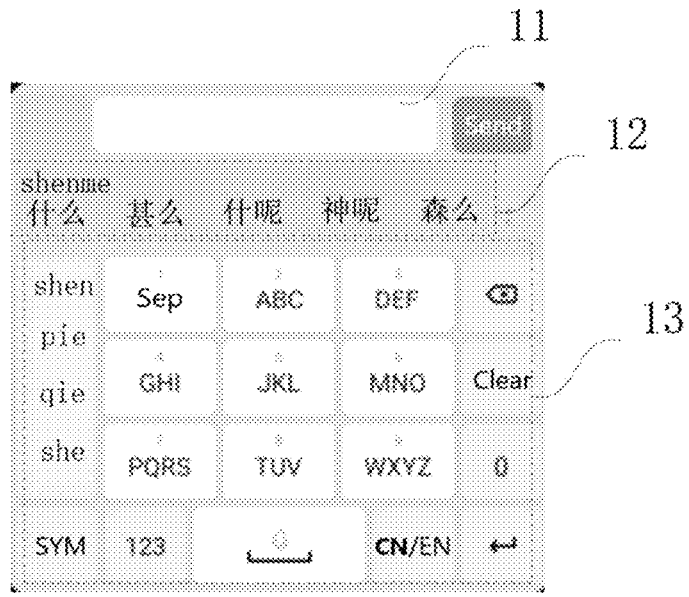
FIG. 9 is a further schematic diagram illustrating the interface of the floating keyboard provided by the embodiment of the present disclosure when the current application is switched from the first application to the second application.

In the embodiment, when an operation performed on the key operation area is detected, the target text may be replaced with a target text corresponding to the operation. In a specific application scenario, in the display state illustrated in FIG. 8, when a touch operation performed on the key operation area 13 is detected, the target text "有志气" displayed in the candidate word preview area may be replaced with the candidate words "什么, 甚么, 什呢, 神呃, 森么" (which are Chinese words corresponding to or in proximity to Chinese phonetic alphabets "shenme") corresponding to the touch operation as illustrated in FIG. 9, so that the content displayed in the candidate word preview area can be flexibly switched according to the user's operation.

In the input method provided in the embodiments of the present disclosure, a floating keyboard corresponding to a current application is displayed, where the floating keyboard includes a key operation area and an input text preview area; and at least one text input through the key operation area is acquired, and the at least one text is displayed as a target text in the input text preview area. When it is detected that the current application is switched from a first application to a second application, the target text is displayed in the candidate word preview area of the floating keyboard. As such, the input content can be viewed directly in the input text preview area of the floating keyboard, without jumping the line of sight to the input box of the current application to view the input content. Therefore, the visual fatigue caused by switching the line of sight back and forth in the text input process is reduced, and the input speed is improved. When it is detected that the current application is switched from the first application to the second application, the target text is displayed in the candidate word preview area of the floating keyboard, so that the user can quickly input the target text, which further improves the input speed.

Figure 10:
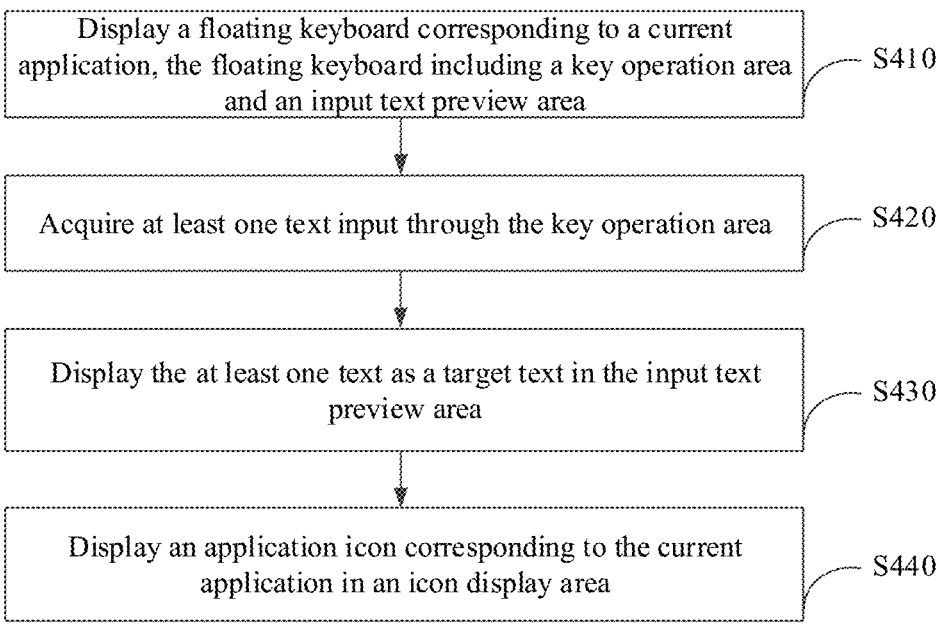
FIG. 10 illustrates a flow chart of an input method provided by yet a further embodiment of the present disclosure.

Referring to FIG. 10, an input method according to yet a further embodiment of the present disclosure is illustrated. The method may be applied to an electronic device, and the method includes operations as follow.

At block S410, a floating keyboard corresponding to a current application is displayed, the floating keyboard including a key operation area and an input text preview area.

At block S420, at least one text input through the key operation area is acquired.

At block S430, the at least one text is displayed as a target text in the input text preview area.

At block S440, an application icon corresponding to the current application is displayed in an icon display area.

The floating keyboard in the embodiment may also include the icon display area, and the icon display area may be configured to display the application icon corresponding to the current application, to remind the user of the application to which the content of a current reply belongs. In addition, this avoids a reply to a wrong message when multiple applications are running simultaneously.

Figure 11:
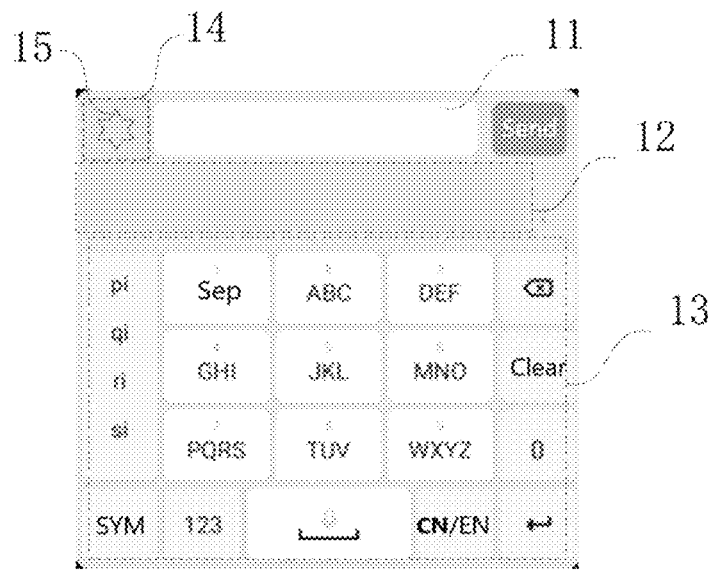
FIG. 11 is an example diagram illustrating display of an application icon of the current application on the floating keyboard provided by the embodiment of the present disclosure.

For example, in a specific application scenario, if the current application is instant messaging application, as illustrated in FIG. 11, the floating keyboard includes an icon display area 14, and an application icon 15 corresponding to the instant messaging application may be displayed in the icon display area 14.

In the embodiment, when it is detected that the current application is switched from a first application to a second application, a first application icon displayed in the icon display area may be switched to a second application icon, where the first application icon corresponds to the first application, and the second application icon corresponds to the second application.

Figure 12:
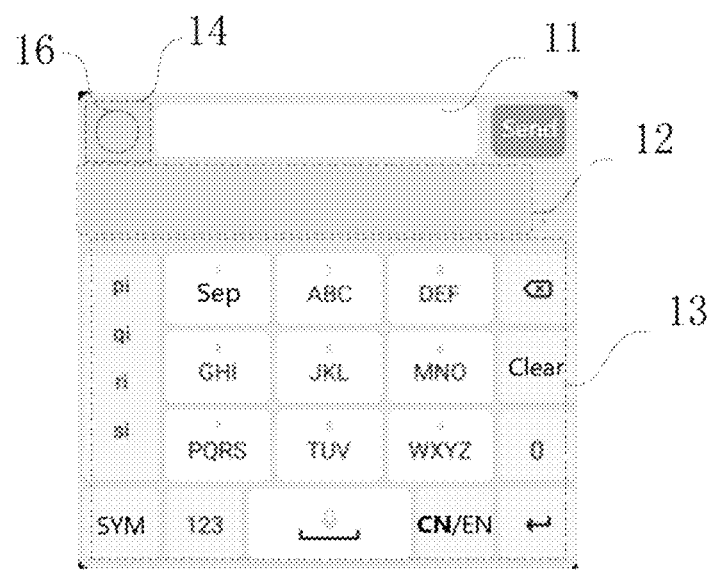
FIG. 12 is an example diagram illustrating application icons displayed on the floating keyboard provided by the embodiment of the present disclosure when the current application is switched from the first application to the second application.

For example, in a specific application scenario, if the first application is the instant messaging application and the second application is game battle application, as illustrated in FIG. 12, when it is detected that the current application is switched from the first application to the second application, the application icon displayed in the icon display area may be switched from the application icon 15 as illustrated in FIG. 11 to an application icon 16 as illustrated in FIG. 12. The application icon 15 corresponds to the instant messaging application, and the application icon 16 corresponds to the game battle application. When the current application is switched, the application icon corresponding to the current application is switched synchronously. As such, it can intuitively remind the user of the application whose message he/she is currently replying to, and avoid the loss caused when the user wrongly sends a message to an object of other application.

In the input method provided in the present disclosure, a floating keyboard corresponding to a current application is displayed, where the floating keyboard includes a key operation area and an input text preview area; and at least one text input through the key operation area is acquired, and the at least one text is displayed as a target text in the input text preview area. In addition, an application icon corresponding to the current application is displayed in an icon display area. As such, the input content may be directly viewed in the input text preview area of the floating keyboard, without jumping the line of sight to the input box of the current application to view the input content. Therefore, the visual fatigue caused by switching the line of sight back and forth in the text input process is reduced, and the input speed is improved. Moreover, by displaying the application icon corresponding to the current application in the icon display area of the floating keyboard, it can conveniently remind the user of the application to which the content of a current reply belongs, this avoids a reply to a wrong message when multiple applications are running simultaneously.

Figure 13:
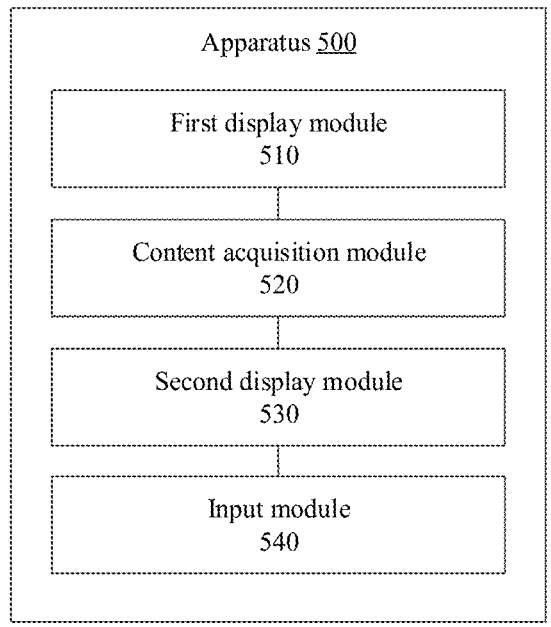
FIG. 13 illustrates a structural block diagram of an inputting apparatus provided by an embodiment of the present disclosure.

Referring to FIG. 13, an inputting apparatus 500 according to an embodiment of the present disclosure is illustrated. The apparatus is implemented on an electronic device, and the apparatus includes: a first display module 510, configured to display a floating keyboard corresponding to a current application, the floating keyboard including a key operation area and an input text preview area.

As an implementation, the first display module may be configured to display the floating keyboard corresponding to the current application, when it is detected that an input box corresponding to a current application is in an active state.

As an implementation, when a cursor is displayed in the input box corresponding to the current application, it may be determined that the input box corresponding to the current application is in the active state.

As an implementation, before the floating keyboard corresponding to the current application is displayed, it may also include that: when multiple applications are in an enabled state at a current moment, the application running in the foreground among the multiple applications each in the enabled state is determined as the current application.

As an implementation, the first display module may further be configured to display the target text in a word candidate preview area of the floating keyboard, when it is detected that the current application is switched from the first application to the second application.

As an implementation, the displaying the target text in the candidate word preview area of the floating keyboard may include: when an operation performed on the key operation area is detected, replacing the target text with a target text corresponding to the operation.

As an implementation, the floating keyboard further includes an icon display area, and the apparatus 500 may further include an application icon display module configured to display an application icon corresponding to the current application in the icon display area.

As an implementation, the displaying the application icon corresponding to the current application in the icon display area may include: when it is detected that the current application is switched from the first application to the second application, switching a first application icon displayed in the icon display area to a second application icon, where the first application icon corresponds to the first application, and the second application icon corresponds to the second application.

The apparatus further includes a content acquisition module 520 configured to acquire at least one text input through the key operation area.

As an implementation, the content acquisition module may be specifically configured to acquire, according to a current input mode of the floating keyboard, the at least one text input through the key operation area.

As an implementation, acquiring, according to the current input mode of the floating keyboard, the at least one text input through the key operation area may include: when the current input mode is a full keyboard English input mode, acquiring the at least one text input through the key operation area.

As an implementation, acquiring, according to the current input mode of the floating keyboard, the at least one text input through the key operation area may include: when the current input mode is a full keyboard Chinese input mode, acquiring candidate texts for an input made through the key operation area; and selecting the at least one text from the candidate text.

As an implementation, the apparatus 500 may further include a data processing module configured to clear out a first target text displayed in the input text preview area, when it is detected that the current application is switched from the first application to the second application, where the first target text corresponds to the first application.

As an implementation, after the first target text displayed in the input text preview area is cleared out when it is detected that the current application is switched from the first application to the second application, the data processing module may be further configured to restore displaying, in the input text preview area, of the first target text that was cleared out, when it is detected that the current application is switched from the second application to the first application.

The apparatus may further include a second display module 530 configured to display the at least one text as the target text in the input text preview area.

The apparatus may further include an input module 540 configured to input the target text into the current application, in response to a content delivery instruction associated with the target text.

As an implementation, the floating keyboard further includes a send button, and before the target text is input into the current application in response to the content delivery instruction associated with the target text, it may also include that: when the send button is triggered, triggering the generation of the content delivery instruction associated with the target text; or, when the word number of the target text acquired reaches a word number threshold, triggering the generation of the content delivery instruction associated with the target text.

As an implementation, the inputting the target text into the current application may include: directly sending, through the floating keyboard, the target text to a message-receiving object in the current application.

As an implementation, the inputting the target text into the current application may include: first sending, through the floating keyboard, the target text to the current application, and then sending, through the current application, the target text to the message-receiving object in the current application.

In the implementation, the apparatus 500 may further include a text content processing module configured to clear out a first target text displayed in the input text preview area, when it is detected that the current application is switched from the first application to the second application, where the first target text corresponds to the first application.

In some implementations, the text content processing module may also be configured to: when it is detected that the current application is switched from the second application to the first application, in response to recognizing that there is no input text in the input text preview area, restore the displaying, in the input text preview area, the first target text that was cleared out; or, in response to recognizing that a second target text displayed in the input text preview area is not null, clear out the second target text displayed in the input text preview area, and resume the displaying, in the input text preview area, of the first target text that was cleared out, where the second target text corresponds to the second application.

In some implementations, the text content processing module may also be configured to display the target text in the candidate word preview area of the floating keyboard when it is detected that the current application is switched from the first application to the second application. In addition, when an operation acting on the key operation area is detected, the target text is replaced with a target text corresponding to the operation.

In the embodiment, the floating keyboard may further include an icon display area, and the apparatus 500 may further include an icon display module configured to display an application icon corresponding to the current application in the icon display area.

In some implementations, the icon display module may also be configured to switch a first application icon displayed in the icon display area to a second application icon when it is detected that the current application is switched from the first application to the second application, where the first application icon corresponds to the first application, and the second application icon corresponds to the second application.

It may be clearly understandable for those skilled in the art that, for the convenience and brevity of the description, the specific working process of the apparatus and modules described above may refer to the corresponding process in the foregoing method embodiments, which will not be repeated here.

In several embodiments provided in the present disclosure, the illustrated or discussed coupling or direct coupling or communication connection between the modules may be indirect coupling or communication connection through some interfaces, devices or modules, and which may be electrical, mechanical, or in other forms.

In addition, the individual functional modules in each embodiment of the present application may be integrated into one processing module, or each module may exist separately and physically, or two or more modules may be integrated into one module. The above integrated modules may be implemented in the form of hardware or in the form of software function modules.

Figure 14:
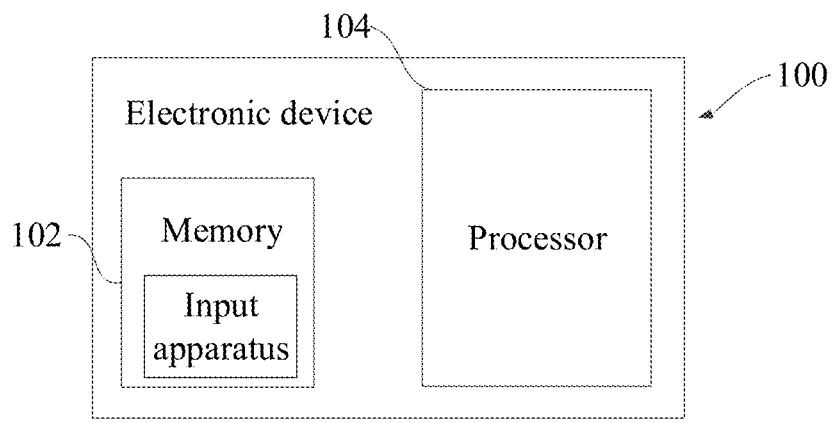
FIG. 14 illustrates a structural block diagram of an electronic device for executing an input method according to an embodiment of the present disclosure.

Referring to FIG. 14, based on the above-mentioned input method and apparatus, an electronic device 100 that may implement the above input method is further provided in the embodiments of the present disclosure. The electronic device 100 includes a memory 102 and one or more (only one is illustrated in FIG. 14) processors 104 coupled to each other, and the memory 102 and the processors 104 are connected by communication lines. The memory 102 stores programs that may execute the contents of the above embodiments, and the processor 104 may execute the programs stored in the memory 102.

The processor 104 may include one or more processing cores. The processor 104 uses various interfaces and lines to connect various parts of the entire electronic device 100, and executes or executes instructions, programs, code sets, or instruction sets stored in the memory 102, and calls data stored in the memory 102 to execute various functions of the electronic device 100 and process data. Optionally, the processor 104 may be implemented with at least one hardware of Digital Signal Processing (DSP), Field-Programmable Gate Array (FPGA), and Programmable Logic Array (PLA). The processor 104 may integrate one or a combination of a Central Processing Unit (CPU), a Graphics Processing Unit (GPU), a modem, and the like. The CPU mainly handles the operating system, user interface and application programs, etc. The GPU is responsible for rendering and drawing the displayed content. The modem is configured to handle wireless communication. It may be understood that the above modem may also not be integrated into the processor 104, but implemented by a separate communication chip.

The memory 102 may include a Random Access Memory (RAM), and may also include a Read-Only Memory. The memory 102 may be configured to store instructions, programs, codes, code sets, or instruction sets. For example, an inputting apparatus may be stored in the memory 102. The inputting apparatus may be the above apparatus 500. The memory 102 may include a program storage area and a data storage area, where the program storage area may store instructions for implementing an operating system and instructions for implementing at least one function (such as a touch function, a sound playback function, and an image playback function), and instructions for realizing the foregoing embodiments, and the like. The data storage area may also store data created during the use of the electronic device 100 (such as phonebook, audio and video data, chat record data), and the like.

Figure 15:
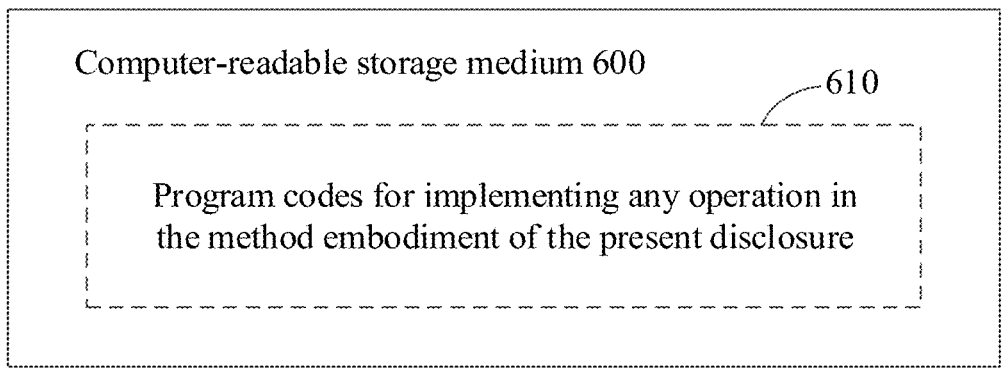
FIG. 15 illustrates a storage unit for storing or carrying program codes for implementing an input method according to an embodiment of the present disclosure.

Referring to FIG. 15, a structural block diagram of a computer-readable storage medium according to an embodiment of the present disclosure is illustrated. Program codes are stored in the computer-readable storage medium 600, and the program codes may be invoked by a processor to execute the method described in the foregoing method embodiments.

The computer-readable storage medium 600 may be an electronic memory, such as flash memory, EEPROM (Electrically Erasable Programmable Read Only Memory), EPROM, hard disk, or ROM. Optionally, the computer-readable storage medium 600 includes a non-transitory computer-readable storage medium. The computer-readable storage medium 600 has a storage space for program codes 610 for implementing any operation of the above method. These program codes may be read from or written into one or more computer program products. The program codes 610 may, for example, be compressed in a suitable form.

To sum up, in the input method and apparatus, electronic device, and storage medium provided in the present disclosure, a floating keyboard corresponding to a current application is displayed, where the floating keyboard includes a key operation area and an input text preview area; and at least one text input through the key operation area is acquired, and the at least one text is displayed as a target text in the input text preview area. In response to a content delivery instruction associated with the target text, the target text is input into the current application. In this way, the input content in the input text preview area of the floating keyboard can be directly viewed, without jumping the line of sight to the input box of the current application to view the input content. Therefore, the visual fatigue caused by switching the line of sight back and forth in the text input process is reduced, and the input speed is improved.

Finally, it is notable that the above embodiments are only used to illustrate the technical schemes of the present disclosure, rather than limiting them. Although the present disclosure has been described in detail with reference to the foregoing embodiments, it is understandable for those of ordinary skill in the art that: the technical schemes described in the foregoing embodiments may still be modified, or some technical features thereof may be replaced by equivalents; and these modifications or replacements do not drive the essence of the corresponding technical schemes to depart away from the spirit and scope of the technical schemes of the various embodiments of the present disclosure.

What is claimed is:

1. An input method, implemented by an electronic device, the input method comprising:
    displaying a floating keyboard corresponding to a current application, the floating keyboard comprising a key operation area and an input text preview area;
    acquiring at least one text input through the key operation area;
    displaying the at least one text as a target text in the input text preview area; and
    in response to a content delivery instruction associated with the target text, inputting the target text into the current application;
    wherein the input method further comprises:
    in response to detecting that the current application is switched from a first application to a second application, clearing out a first target text displayed in the input text preview area, wherein the first target text corresponds to the first application.

2. The input method of claim 1, wherein acquiring the at least one text input through the key operation area comprises:
    acquiring, according to a current input mode of the floating keyboard, the at least one text input through the key operation area.

3. The input method of claim 2, wherein acquiring, according to the current input mode of the floating keyboard, the at least one text input through the key operation area comprises at least one of:
    in response to the current input mode being a full keyboard English input mode, acquiring the at least one text input through the key operation area; and in response to the current input mode being a full keyboard Chinese input mode, acquiring candidate texts for an input made through the key operation area; and selecting the at least one text from the candidate texts.

4. The input method of claim 1, further comprising:
adapting the floating keyboard to the current application, wherein different applications correspond to different display styles of the floating keyboard.

5. The input method of claim 1, wherein after clearing out the first target text displayed in the input text preview area in response to detecting that the current application is switched from the first application to the second application, the method further comprises:
in response to detecting that the current application is switched from the second application to the first application, restoring displaying, in the input text preview area, of the first target text that was cleared out.

6. The input method of claim 1, wherein the method further comprises:
in response to detecting that the current application is switched from the first application to the second application, displaying the target text in a candidate word preview area of the floating keyboard.

7. The input method of claim 6, wherein the method further comprises:
in response to acquiring at least one further text input through the key operation area, replacing the target text with a target text corresponding to the at least one further text.

8. The input method of claim 6, wherein displaying the target text in the candidate word preview area of the floating keyboard comprises:
displaying a plurality of target texts corresponding to the first application in the candidate word preview area of the floating keyboard, in order of sending frequencies of the plurality of target texts; or
displaying a plurality of target texts corresponding to the first application in the candidate word preview area of the floating keyboard, in order of input times of the plurality of target texts.

9. The input method of claim 1, wherein the floating keyboard further comprises an icon display area, and the method further comprises:
displaying, in the icon display area, an application icon corresponding to the current application.

10. The input method of claim 9, wherein displaying, in the icon display area, the application icon corresponding to the current application comprises:
in response to detecting that the current application is switched from the first application to the second application, switching a first application icon displayed in the icon display area to a second application icon, wherein the first application icon corresponds to the first application, and the second application icon corresponds to the second application.

11. The input method of claim 1, wherein displaying the floating keyboard corresponding to the current application comprises:
in response to detecting that an input box corresponding to the current application is in an active state, displaying the floating keyboard corresponding to the current application.

12. The input method of claim 11, wherein the method further comprises:
in response to a cursor being displayed in the input box corresponding to the current application, determining that the input box corresponding to the current application is in the active state.

13. The input method of claim 1, wherein displaying the floating keyboard corresponding to the current application comprises:
in response to a trigger operation performed on a shortcut button for the floating keyboard that is provided in a notification bar of the electronic device, displaying the floating keyboard on an interface of the current application.

14. The input method of claim 1, wherein before displaying the floating keyboard corresponding to the current application, the method further comprises:
in response to detecting that there are multiple applications each in an enabled state at a current moment, determining, as the current application, an application running in foreground from the multiple applications each in the enabled state, or
determining a newly started application as the current application.

15. The input method of claim 1, wherein the floating keyboard further comprises a send button, and before inputting the target text into the current application in response to the content delivery instruction associated with the targeted text, the method further comprises:
in response to triggering of the send button, generating the content delivery instruction associated with the target text; or
in response to a word number of the target text acquired reaching a word number threshold, generating the content delivery instruction associated with the target text.

16. The input method of claim 1, wherein inputting the target text into the current application comprises:
directly inputting, through the floating keyboard, the target text into the current application.

17. The input method of claim 1, wherein inputting the target text into the current application comprises:
directly sending, through the floating keyboard, the target text to a message-receiving object in the current application, or
first sending, through the floating keyboard, the target text into the current application, and sending, through the current application, the target text to a message-receiving object in the current application.

18. An electronic device, comprising:
one or more processors and a memory, wherein one or more programs are stored in the memory and configured to be executed by the one or more processors, and the one or more programs are configured to:
display a floating keyboard corresponding to a current application, the floating keyboard comprising a key operation area and an input text preview area;
display at least one text input through the key operation area, as a target text in the input text preview area; and
in response to a content delivery instruction associated with the target text, input the target text into the current application;
wherein the one or more programs are further configured to:
in response to detecting that the current application is switched from a first application to a second application, clear out a first target text displayed in the input text preview area, wherein the first target text corresponds to the first application.

19. A non-transitory computer-readable storage medium, storing program codes therein, the program codes, when being executed by a processor, cause the processor to:
- in response to detecting a text input instruction corresponding to a current application, display a floating keyboard corresponding to the current application, the floating keyboard comprising a key operation area and an input text preview area;
- display at least one text input through the key operation area, as a target text in the input text preview area; and
- in response to a content delivery instruction associated with the target text, input the target text into the current application;
- wherein the current application is an instant message application, association between the floating keyboard and the current application is established in such a manner that the floating keyboard has a same text control function as an input box of the current application; and the target text is directly input into a message-receiving object of the current application in response to the content delivery instruction associated with the target text.

20. The non-transitory computer-readable storage medium of claim 19, wherein the program codes, when being executed by the processor, further cause the processor to:
- in response to detecting that the current application is switched from a first application to a second application, clearing out a first target text displayed in the input text preview area, wherein the first target text corresponds to the first application.

* * * * *